United States Patent [19]

Sfarti

[11] Patent Number: 4,514,673
[45] Date of Patent: Apr. 30, 1985

[54] STEPPER MOTOR CONTROLLER

[75] Inventor: Adrian Sfarti, Sunnyvale, Calif.

[73] Assignee: Advanced Micro Devices, Inc., Sunnyvale, Calif.

[21] Appl. No.: 564,979

[22] Filed: Dec. 23, 1983

[51] Int. Cl.[3] ............................................ H02K 29/04
[52] U.S. Cl. .................................... 318/685; 318/696
[58] Field of Search ................ 318/685, 696; 364/200, 364/900

[56] References Cited

U.S. PATENT DOCUMENTS

4,275,458 6/1981 Khera .................................... 364/900
4,442,504 4/1984 Dummermuth et al. ............ 364/900

Primary Examiner—Stanley J. Witkowski
Assistant Examiner—Saul M. Bergmann
Attorney, Agent, or Firm—Patrick T. King; J. Vincent Tortolano

[57] ABSTRACT

A stepper motor controller, for use with a main computer having vector interrupt capability, includes main address and data terminals, interrupt terminals, a select-/enable terminal and control terminals, and is used to control the operation of a stepper motor pursuant to instructions from the main computer. The main computer enables a selected controller to accept commands or data through a decoder coupled to the select terminal. The controllers provide accept and error interrupt signals to the main computer when it is ready to receive data and to notify the main computer when an error condition is found. The controller generates a controller identifier message at its data terminals substantially simultaneously with the production of the interrupt signals to identify which controller is generating the interrupt signal. This eliminates the need for the main computer to poll the controllers.

12 Claims, 6 Drawing Figures

```
STOP    — 1       40 — VCC
X1      — 2       39 — EXTCLK
X2      — 3       38 — ERR
RESET   — 4       37 — PROGRAM
VCC     — 5       36 — IBE
CS      — 6       35 — OBF
VSS     — 7       34 — PHASECLK
RD      — 8       33 — XHOME
C/D     — 9       32 — XDIR
WR      — 10      31 — STOPACK
CLKOUT  — 11      30 — A
D0      — 12      29 — B
D1      — 13      28 — C
D2      — 14      27 — D
D3      — 15      26 — VCC
D4      — 16      25 — VCC
D5      — 17      24 — DIR
D6      — 18      23 — POWER
D7      — 19      22 — POSLIM
VSS     — 20      21 — NEGLIM
```

FIG._5.

STEPPER MOTOR CONTROLLER

BACKGROUND OF THE INVENTION

With the consistent decline in their cost, stepper motors are finding increased use in industrial controls, automated manufacturing and production equipment, numerical machine tools and consumer items, such as printers and disc drives. As mechanisms, such as industrial robots, which use stepper motors to control their movements, become more complicated, the required number of stepper motors increases. However, along with this increase in number is an increase in the need for keeping the controller components small enough to fit in tight spaces and intelligent enough to generate complex sequences of motions. For this purpose, microprocessors have been found to be very well suited.

Although a general purpose microprocessor can be used to control stepper motors, the initial purchase price and the cost of custom programming by the customer would undoubtedly be high. Thus, there have been developed co-processor based stepper motor controllers which are used in conjunction with a main computer. The stepper motor controller unburdens the main computer, typically a microprocessor, from the task of directly controlling and constantly monitoring large numbers of stepper motors. Examples of such stepper motor controllers are those made by Cybernetics Micro Systems of Los Altos, Calif. and sold as the CY 500 and the CY 512.

Prior art microprocessor stepper motor controllers commonly communicate with a main computer by initiating an interrupt signal. When the interrupt is generated, the main computer must read the status of all the controllers to find out which controller generated the interrupt. This procedure is called polling. However, in a multi-controller, multi-stepper motor environment, polling procedures can take appreciable time which can affect the speed of operation of the device or apparatus being controlled.

SUMMARY OF THE INVENTION

The present invention is directed to a stepper motor controller which provides an identifying vector to eliminate the need for the main computer to poll the controllers upon receipt of an interrupt signal.

The stepper motor controller of the invention finds its greatest utility when used with a main computer having vector interrupt capability. The controller includes data terminals, interrupt terminals, control terminals and stepper motor output terminals, and is used to control the operation of a stepper motor pursuant to instructions from the main computer. The stepper motor output terminals are connected to its associated stepper motor through a driver. The various terminals of the stepper motor controller, also sometimes called the slave microprocessor, are coupled to the main computer through appropriate lines and buses.

The select terminal, also called the chip select terminal, is used to enable the controller to accept data or commands from the main computer. The main computer provides address information identifying which controller is to be enabled to accept the commands or data. This is accomplished through a decoder having a number of output terminals, one output terminal coupled to the select terminal of each of the slave microprocessors. The decoder accepts the multi-bit address and produces a chip select signal at one of its several outputs, one of which is connected to the chip select terminals of each of the several controllers.

The slave microprocessors are adapted to produce two interrupt signals at their interrupt terminals. These interrupt signals are called accept (also called input buffer empty or IBE) and error interrupt signals. The accept and error interrupt signals are provided to the main computer when the slave microprocessor controller is ready to receive information from the main computer or to interrupt the main computer when an error condition is encountered.

The controller also generates a controller identifier message, also called a vector identifier signal or vector interrupt, at its data terminals substantially simultaneously with the production of the interrupt signals. The identifier message identifies which of the several microprocessors is generating the interrupt signal. This eliminates the need for the main computer to poll the slave microprocessor controllers whenever an interrupt signal is received. Thus, dialogue with the controller is established only when the controller requires some information from the main computer (IBE) or an error has occurred. No vector identifier signal needs to be produced when the controller's output buffer is full and is ready to be read by the main computer because the controller places information at its output register only in conjunction with the execution of a read instruction by the slave microprocessor controller; this implies that the main computer already knows the address of the slave microprocessor controller which will execute the read command.

A primary feature of the controller is that it provides an identifying vector to the data terminals of the main computer when the controller generates an interrupt signal. This allows the main computer to identify the slave microprocessor generating the interrupt without polling the controllers. In one embodiment it has been found that producing a vectored interrupt and an acknowledge takes about $2\mu$ seconds while polling takes about $10\mu$ seconds for each controller. Since on the average half of the controllers must be polled before finding the one sending the interrupt signal, the average polling line will be $(N\pm2)\cdot 10$ msec, where N is the number of controllers. Thus use of these vectored interrupts greatly increases the speed of communication between the main and slave microprocessors in a multi-controller environment.

Another feature of the invention relates to the location of the identifying vector for each controller. In one embodiment a location in the program memory of the microprocessor is reserved for the identifying vector for that microprocessor. The vector is entered into the memory location at the factory and thus remains unchanged. However, in a second embodiment the microprocessor controller is provided a register for the vector. In this situation, at system start-up the main computer writes a different vector into the vector register of each controller. This dynamic allocation of vectors provides a very powerful, flexible tool for the user.

Other features and advantages of the invention will appear from the following description in which the preferred embodiments have been set forth in detail in conjunction with the accompanying drawings.

DETAILED DESCRIPTION OF THE PREFERRED EMBODIMENTS

Figure 1:
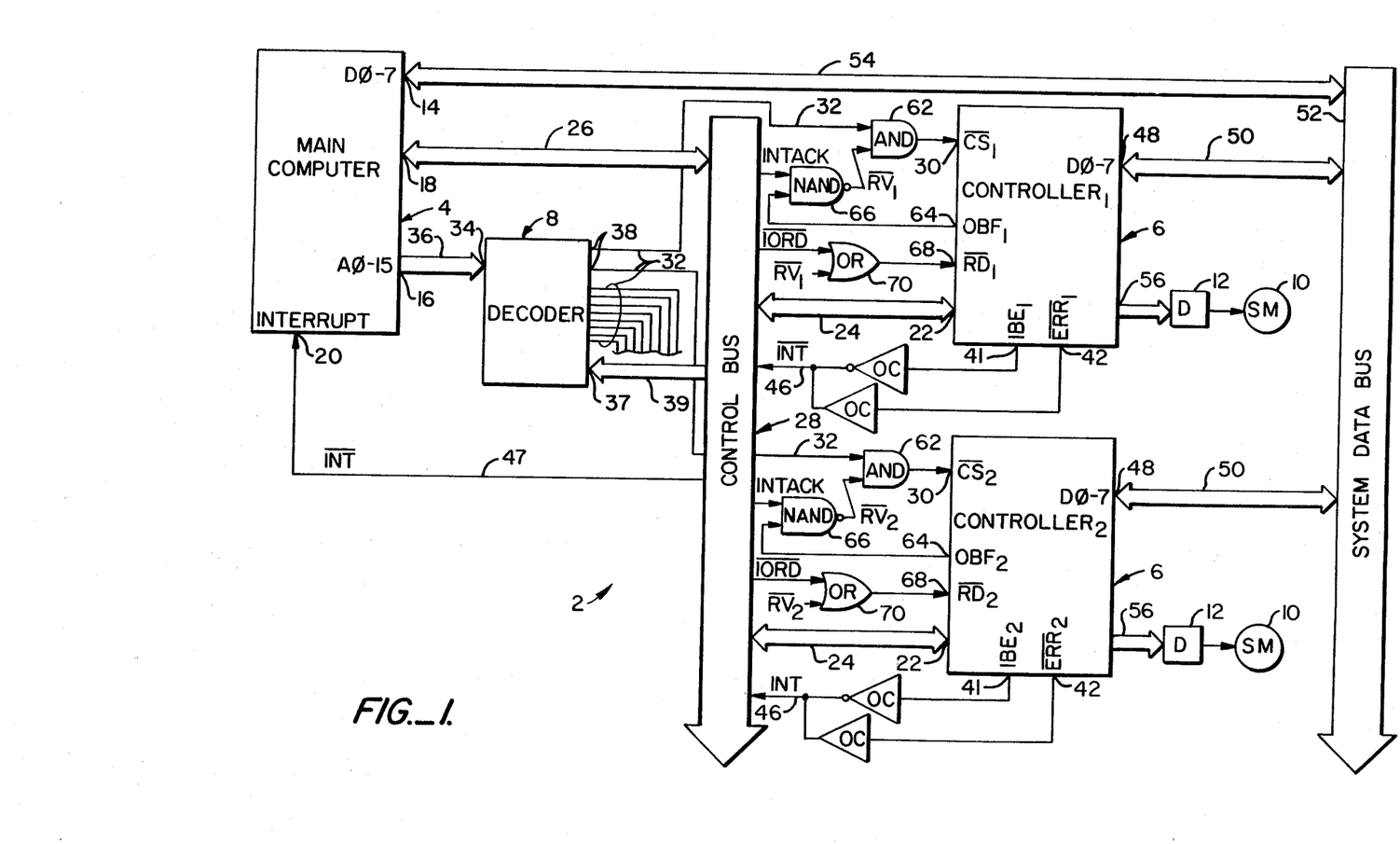
FIG. 1 is a schematic representation of a first embodiment of the stepper motor controller system made according to the present invention.

Referring now to FIG. 1, a stepper motor controller system 2 is shown and includes broadly a main computer 4, typically a microprocessor, coupled to a number of slave microprocessors 6 through various lines and buses, described below, and a decoder 8. Each controller 6 drives a stepper motor 10 through a driver 12.

Main computer 4 is a demultiplexed microprocessor, such as the Z80 microprocessor made by Zilog of Cupertino, Calif., and has vectored interrupt capability. That is, main computer 4 can receive identifying information, commonly called vectors, at its data terminals 14. Main computer 4 is demultiplexed so that it has separate data terminals 14, labeled D0–7, and address terminals 16, labeled A1-15. Main computer 4 also includes several control terminals 18 and an interrupt terminal 20.

Controllers 6 each include slave control terminals 22 which are coupled to main control terminals 18 by control lines 24, 26 through a control bus 28. Control terminals 22, 18 are used in conjunction with the transfer of data or commands between main computer 4 and controllers 6.

Main controller 6 includes a select terminal 30, labeled $\overline{CS}$, which is used to enable or actuate controller 6. Terminal 30 of each controller 6 is connected to decoder 8 through a separate select signal line 32. Decoder 8 is a standard part, such as part no. 74LS138 made by Texas Instruments, and includes a number of input terminals 34, which are coupled to main address terminal 16 through address lines 36. Decoder 8 also includes several output terminals 38 each connected to a different line 32 and control terminals 37 coupled to control bus 28 through lines 39. Decoder 8 applies a low signal to one of several lines 32 according to the multibit address signal received from main address terminals 16 and the control signals at terminals 37.

In the preferred embodiment eight controllers 6 are controlled by a single decoder 8. This requires three address lines 36 from address terminals 16 to input terminals 34 of decoder 8. Eight different signal select lines 32 are connected to eight output terminals 38 of decoder 8. Typically one decoder 8 and eight controllers 6 are mounted to a single board. With an eight bit microprocessor 4, a total of 256 different controllers 6 may be addressed through a decoder 8. However, such a decoder having eight input terminals 34 and 256 output terminals 38 would, for practical reasons, be replaced by a number of decoders, each connected to the three lowest order bits from address terminals 16. Control terminals 37 are used to enable the various decoders 8 according to the value of the five highest order address bits. Therefore as used in this application, a decoder may be a single component having the required number of input and output terminals or a set of decoders arranged to provide the required number of controllers 6.

Interrupt terminal 41, labeled IBE (input buffer empty), is used to interrupt main computer 4 when controller 6 is ready to accept data while interrupt terminal 42, labelled $\overline{ERR}$ (error interrupt), is used when controller 6 senses a programming error. Terminals 41, 42 are connected to control bus 28 by an interrupt line 46, labeled $\overline{INT}$, which is active when low. A line 47, also labeled $\overline{INT}$, couples bus 28 to interrupt terminal 20 of main computer 4.

Controller 6 has eight data terminals 48, labeled D0–7 in the figure, which are connected to data terminals 14 of main computer 4 via data lines 50, a system data bus 52 and data lines 54. Data lines 50, 54 and bus 52 allow main computer 4 to send data to controller 6 and also allow controller 6 to send a controller identifier message to main computer 4 whenever an interrupt signal is provided at interrupt terminals 41, 42. This is described in more detail below.

Controller 6 includes four stepper motor terminals 56 at which appropriate signals are produced to drive stepper motor 10 through driver 12. Driver 12 boosts the signals at terminals 56 sufficiently to drive stepper motor 10.

Figure 2:
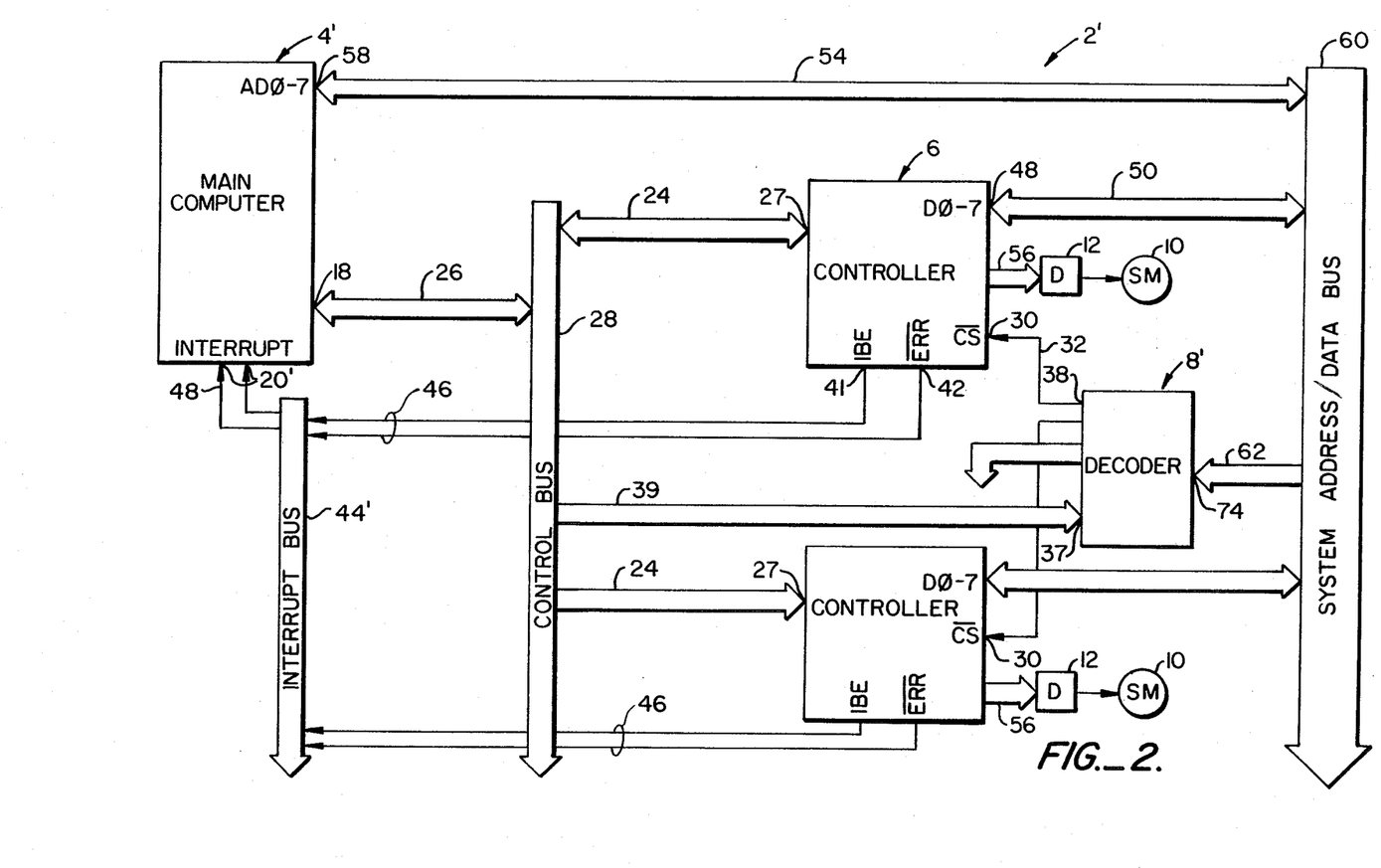
FIG. 2 is a view similar to FIG. 1 of a second embodiment of the invention.

FIG. 2 shows an alternative embodiment of the invention adapted for use with a multiplexed main computer 4' which uses combined address/data terminals 58 for both data and addresses. Stepper motor controller system 2' is similar to stepper motor controller system 2 of FIG. 1 except as follows. Address/data terminals 58, labeled AD0–7, are coupled to a system address/data bus, 60 by lines 54. Decoder 8' has its input terminals 74 coupled to bus 60 via lines 62, rather than directly to address terminals 16 as in the embodiment of FIG. 1. Also, main computer 4' includes two main interrupt terminals 20' as opposed to the single interrupt terminal 20 of the embodiment of FIG. 1. However, systems 2 and 2' operate in substantially the same way.

Figure 3A:
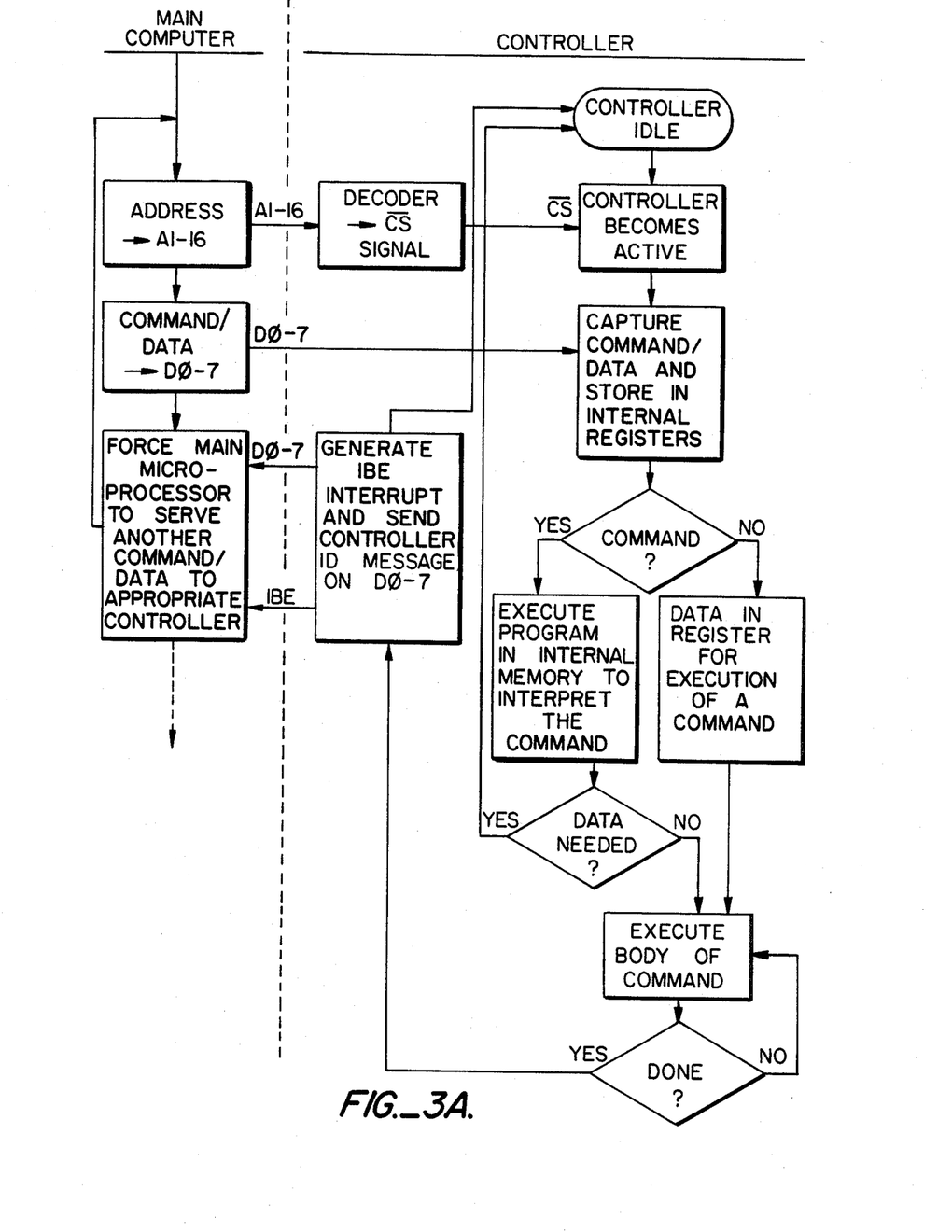
FIG. 3A a flow diagram showing the basic operation of the controller and its interaction with a main computer.

Turning now to FIGS. 1 and 3A, the operation of controller 6 and its interaction with main computer 4 will be described. Initially controller 6 is in an idle condition. When main computer 4 wishes to activate a particular controller an address is placed at main address terminals 16 for receipt by decoder 8. Decoder 8 then applies a chip select signal along the appropriate line 32 and through an AND gate 62 where it is received by terminal 30 of the appropriate controller 6. This causes that controller 6 to become active. Shortly after providing an address at address terminals 16, main computer 4 provides command/data at data terminals 14 which is captured by the controller 6 which has become active upon receipt of the select signal. This command/data is placed in internal registers within controller 6. Controller 6 then interrogates the command/data to determine if it is a command or data. If it is a command, controller 6 executes the appropriate program in its internal memory; if it is data, the data is stored in a register for use in execution of a command. Data transmitted by main computer 4 to controller 6 is typically the number of steps and step rate for stepper motor 10.

After executing the program in internal memory to interpret the command, controller 6 decides whether or not additional data is needed. If additional data is needed, the controller returns to controller idle condition. If additional data is not needed, the body of the command is executed by the controller. Once the body of the command is completely executed, controller 6 generates an IBE (accept) interrupt signal at terminal 41 and also generates a controller identifier message (vector) at data terminals 48 for transmission to main computer 4. Upon receipt of $\overline{INT}$, main computer 4 produces an INTACK (interrupt acknowledge) signal. As described below, the interrupting controller 6 then sends its identifying vector to the main computer 4. This tells the main computer to serve another command/data on the appropriate controller 6 as indicated in the flow chart. Controller 6 then returns to its initial controller idle condition.

The presence of a valid vector at the output register of controller 6, to which terminals 48 are connected, is signalled by an output buffer full (OBF) terminal 64 going high. The OBF signal, in combination with an INTACK (interrupt acknowledge) signal from main computer 4 through control bus 28, produces an $\overline{RV}$ signal from NAND gate 66 which, when combined with the chip select signal from decoder 8 provides chip select terminal 30 with an active (low) chip select signal. The generation of $\overline{RV}$, combined with an $\overline{IORD}$ (input/output read—as opposed to a memory read) signal from main computer 4 by OR gate 70 produces an $\overline{RD}$ (read) signal at read terminal 68. After the vector has been read through terminals 48, INTACK becomes inactive (low) which makes $\overline{RV}$ inactive (high) which causes $\overline{RD}$ to become inactive (high) which causes OBF to become inactive (low).

Figure 3B:
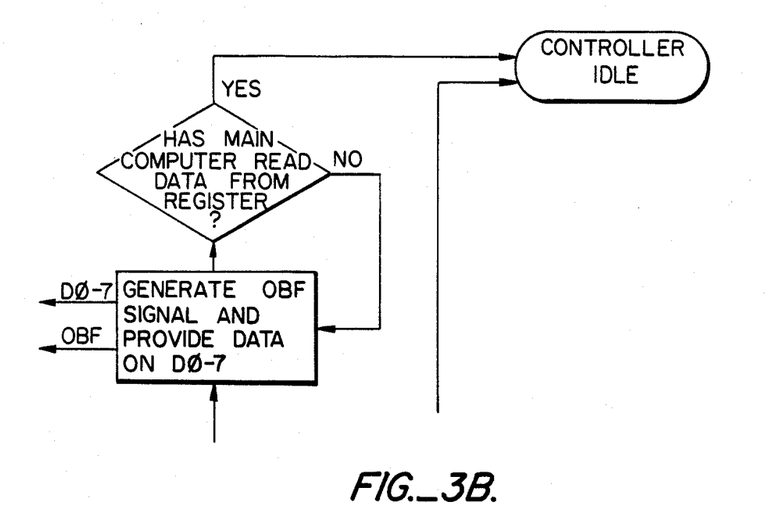
FIG. 3B is a partial flow diagram showing the program steps associated with the generation of an output buffer full interrupt signal.

In some circumstances, main computer 4 needs data from controller 6, for example, the position of stepper motor 10 or its status, such as whether stepper motor 10 has reached a limit or is stopped. In this case, executing the body of the command results in controller 6 placing this requested data at its data terminals 48. When the body of the command is finished executing, a slight change in the flow diagram of FIG. 3 occurs and is shown in FIG. 3B. At this point, controller 6 provides an OBF (transmit) signal at terminal 64. Although controller 6 could be programmed to provide a controller ID message at data terminals 48, this is not necessary since main computer has requested the data from the particular controller generating the data; thus main computer 6 knows which controller 6 is presenting it data. Controller 6 continues to generate the OBF interrupt until the main computer 4 has read the data from a controller register through data terminals 48. OBF becomes inactive (low) after RD becomes inactive (high). Controller 6 then returns to its idle condition.

Figure 4:
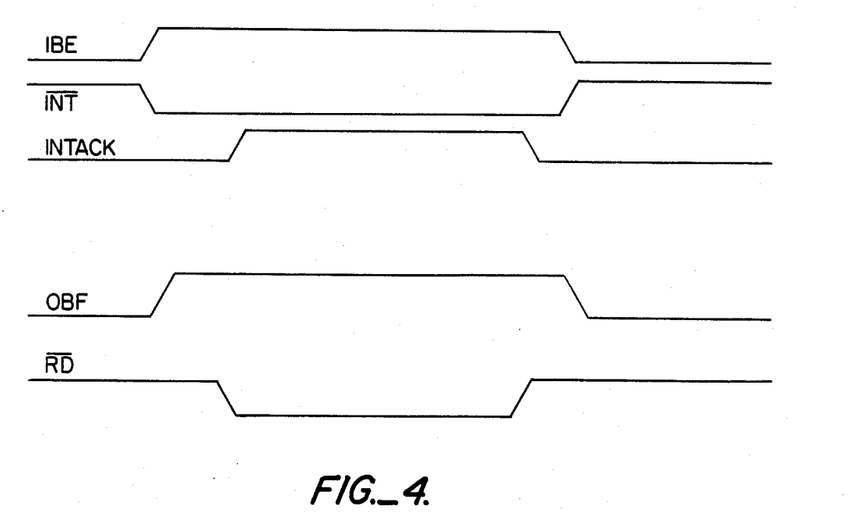
FIG. 4 is a timing diagram for various signals.

FIG. 4 shows the timing and logic states of the IBE, $\overline{INT}$, INTACK, OBF and $\overline{RD}$ signals.

Error signals are provided by controller 6 when a program error is discovered. For example, if two commands in a row are received from main computer 4, as opposed to a command and then data, an error signal will be produced by controller 6 at interrupt terminal 42.

In the preferred embodiment of stepper motor controller system 2, controller 6 is a microprocessor made by Intel Corporation of Santa Clara, Calif., and sold as the Intel 8741 and is programmed to perform the needed functions.

Figure 5:
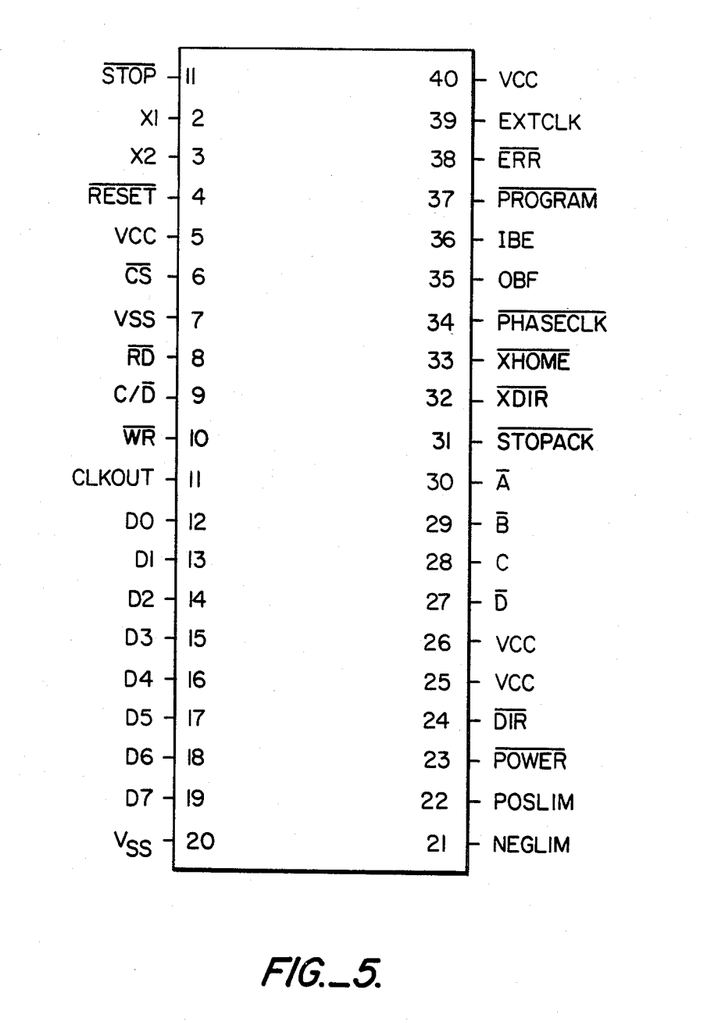
FIG. 5 is a pinout representation of the controller of FIG. 1.

FIG. 5 is a pinout diagram of controller 6 identifying the pin locations and the signal descriptions at each terminal. The following is a brief description of the signals at various terminals.

TABLE 1

| | |
|---|---|
| D0–D7 | Three-state bidirectional Data Bus used for interfacing to an 8-bit main computer. |
| $\overline{RD}$ | I/O read input which enables the main computer to read data/status for the controller. |
| $\overline{WR}$ | I/O write input which enables the main computer to write data to the controller. |
| C/$\overline{D}$ | Signal used by the main computer to specify whether a command (C/$\overline{D}$=High) or data (C/$\overline{D}$=Low) are transferred to the controller. |
| $\overline{CS}$ | Chip select input used to select one controller out opf several connected to a common bus. When $\overline{CS}$=High, the communication I/O buffer is disabled so the controller keeps running without being able to accept any new command. |
| $\overline{STOP}$ | When this input goes Low the motor is brought to a stop. The controller internal registers remain unaltered. This input is tested after each execution of a (half) step. $\overline{STOP}$ is generated by a momentary push button. |
| NEGLIM (POSLIM) | Inputs from an external sensor switch that detects when the motor has reached the leftmost (rightmost) position on X-axis. When one of these inputs goes High, the motor is instantly brought to a stop. Internal controller registers remain unaltered. These inputs are tested after each execution of a (half) step. Motion can be resumed after the amin computer issues a specified command followed by the appropriate motion command. |
| CLKOUT | Output that occurs once per instruction cycle. Can be used as a strobe for external circuitry. |
| $\overline{XDIR}$ | This input from an external switch is used only for specifying the motion direction (Clockwise=Low, Counter-clockwise=High) during the homing of the motor. |
| $\overline{XHOME}$ | This is an input from an external sensor switch that goes Low when the motor reaches the home position. This input is tested continuously after executing each step during an "09" command (see Table 2). |
| $\overline{STOPACK}$ | Output signal which constitutes an acknowledgement to the $\overline{STOP}$ going Low edge. It is set back high by an "07" command. |
| $\overline{A}, \overline{B}, \overline{C}, \overline{D}$ | The four driving phases of the stepper motor. |
| OBF | This output is used to interrupt the main computer when the controller is ready to transfer some data from its buffer register to the main computer. |
| IBE | This output is used to interrupt the main computer when the controller is ready to receive some data from the main computer. |
| $\overline{ERR}$ | When a programming error is detected, this output is driven Low and interrupts the main computer. |
| $\overline{POWER}$ | This output is normally High. An "OC" command (see Table 2) drives this output Low (full voltage to the motor coils). An "OB" |

TABLE 1-continued

| | |
|---|---|
| | command drives this output High (holding voltage to the motor coils). |
| X1, X2 | Connections to 6 MHz crystal. |
| $\overline{\text{DIR}}$ | This output is equal to the CCW/$\overline{\text{CW}}$ bit of the STPMOD register. High indicates counter-clockwise motion. It gets updated every time a motor motion begins. |
| $\overline{\text{PHASECLK}}$ | This output is pulsed Low for two controller clock cycles every time a new motor phase pattern is output. |
| EXTCLK | Input used for synchronized driving of several controllers at the same time. |
| $\overline{\text{PROGRAM}}$ | This output goes Low when an "Execute Program" command is excuted. "Quit Program Mode" instruction drives it back high. |

In the preferred embodiment, the controller address, which corresponds to the controller identifier message, is placed in program memory at the factory. This type of controller would likely be identified with a part number designation followed by a −0 through −255, depending upon the controller identifier address placed in memory. Of course, for 16 bit microprocessors a much greater number of different controller identifier addresses is available.

Controller 6 can also be made so that the controller address can be placed in a register of the controller at system start up. In this case, main computer 4 writes a different controller identifier address into the identifier register of each controller at system start-up. Each time the identifying vector of a particular controller is required, the contents of the identifier register of that controller is placed upon the data bus for the main computer to read. This dynamic allocation of controller identifiers provides a very powerful, flexible tool for the user.

Other modifications and variations can be made to the disclosed embodiments without departing from the subject of the invention as defined in the following claims.

1. A slave microprocessor stepper motor controller, for use in conjunction with a main computer having vectored interrupt capability and including main address and data terminals, a main interrupt terminal and a main control terminal, the slave microprocessor comprising:
   a stepper motor output terminal;
   a slave data terminal;
   a slave control terminal;
   a slave select/enable terminal;
   said slave microprocessor arranged and adapted to produce and transmit an accept interrupt signal at an accept interrupt terminal for transmission to said main interrupt terminal to alert the main computer that said slave microprocessor is ready to accept information through said slave data terminal, said slave microprocessor generating a slave microprocessor identifier message at said slave data terminal substantially simultaneously with production of said accept interrupt signal to identify the slave microprocessor that generated said accept interrupt signal, and said slave microprocessor also generating a signal which combines with an interrupt acknowledge signal from said main computer such that said slave microprocessor is selected to send said identifier message to said main computer; whereby at said substantially simultaneous generation of said identifier message and said accept interrupt signal by said slave microprocessor, said main computer can receive address information identifying the slave microprocessor sending the accept interrupt signal so that polling of a number of slave microprocessors is not required, and so that the use of a separate interrupt controller is not required.

2. The stepper motor controller of claim 1 wherein said slave microprocessor is arranged and adapted to produce an error interrupt signal at interrupt terminal alerting said main computer that an error is detected by said slave microprocessor, and to generate a slave microprocessor identifier message at said slave data terminal substantially simultaneously with said error interrupt signal.

3. The stepper motor controller of claim 1 wherein said slave microprocessor includes a slave microprocessor identifier register into which the main computer writes a slave microprocessor identifier for transmission to the main computer upon generation of said accept interrupt signal.

4. A method for controlling a number of stepper motors comprising:
   providing a decoder with a plurality of lower order bits from a plurality of address terminals of the main computer;
   placing a decoder chip select signal at one of a plurality of decoder output terminals so as to provide a select/enable signal to a chosen slave microprocessor by a main computer;
   capturing information from the main computer by the chosen slave microprocessor;
   driving a stepper motor connected to the chosen slave microprocessor according to the information captured by the chosen slave microprocessor;
   producing an accept interrupt signal by the chosen slave microprocessor for transmission to the main computer when the slave microprocessor is ready to accept information from the main computer;
   generating an identifier signal identifying the chosen slave microprocessor substantially simultaneously with the production of the accept interrupt signal, whereby polling of the number of slave microprocessors by the main computer is not required;
   producing an error interrupt signal upon detection of an error by the slave microprocessor; and
   generating the identifier signal of the chosen microprocessor substantially simultaneously with the production of the error interrupt signal.

5. The stepper motor controller method of claim 4 further comprising the steps of:
   generating an output buffer full (OBF) signal by said slave microprocessor when said slave microprocessor has information for the main computer;
   combining the OBF signal with an interrupt acknolwedge (INTACK) signal from the main computer at a NAND gate output terminal to produce a NAND output signal, the NAND gate output terminal coupled to an input terminal of an AND gate;
   combining the decoder chip select signal with the NAND output signal at said AND gate to produce a chip select ($\overline{\text{CS}}$) signal at the output terminal of the AND gate; and
   providing a chip select input terminal of the chosen slave microprocessor with the $\overline{\text{CS}}$ signal to enable the slave microprocessor.

6. A stepper motor controller system for controlling the operation of a number of stepper motors comprising:
- a main computer including main address and data terminals, a main interrupt terminal and a main control terminal, said main computer having vector interrupt capability;
- a number of slave microprocessors each operably coupled to a corresponding stepper motor through a stepper motor output terminal, each said slave microprocessor including a slave data terminal, a slave interrupt terminal, a slave select terminal and a slave control terminal;
- select lines coupling said main address and slave select terminals so said main computer activates a chosen slave microprocessor according to the address at said address terminals;
- control lines operably coupling said main and slave control terminals to one another;
- slave interrupt lines operably coupling said main and slave interrupt terminals to one another; and
- said number of slave microprocessors arranged and adapted to produce an accept interrupt signal at said slave interrupt terminals, for transmission to said main interrupt terminal via said interrupt lines, to alert said main computer that said slave microprocessor is ready to accept information through said slave data terminal, said slave microprocessor generating a slave microprocessor identifier message at said slave data terminal substantially simultaneously with production of said accept interrupt signal to identify which of said number of slave microprocessors generated said accept interrupt signal, said slave microprocessor which generated said identifier message also generating a signal which combines with an interrupt acknowledge signal from said main computer such that said slave microprocessor is selected to send said identifier message to said main computer;
- whereby at said substantially simultaneous generation of said identifier message and said accept interrupt signal, said main computer receives address information identifying which of said number of slave microprocessors sent the accept interrupt signal so that polling said number of slave microprocessors is not required, and so that the use of a separate interrupt controller is not required.

7. The stepper motor controller system of claim 6 comprising:
an address decoder having input terminals connected to said main address terminals and output terminals connected to said slave select terminal of each of said number of slave microprocessors, said decoder adapted to provide a select signal to one of said slave select terminals thereby activating the chosen slave microprocessor according to a slave address provided by said main computer at said main address terminals.

8. The stepper motor controller system of claim 6 wherein said slave microprocessor is arranged and adapted to produce an error interrupt signal at said slave interrupt terminal alerting said main computer that an error is detected by said slave microprocessor, and to generate a slave microprocessor identifier message at said slave data terminal substantially simultaneously with said error interrupt signal.

9. The stepper motor controller system of claim 6 wherein:
said main computer is demultiplexed and includes separate main data and main address terminals; and
an address bus coupled to said main address terminal and a system data bus coupled to said main data terminal.

10. The stepper motor controller system of claim 6 wherein said main computer and said slave microprocessors include eight main and eight slave data terminals respectively.

11. The stepper motor controller system of claim 6 further comprising a driver connected between said stepper motor output terminal of each said slave microprocessor and one of the number of stepper motors.

12. The stepper motor controller system of claim 6 further comprising:
a first bus;
main data and address lines connected to said first bus;
a slave data line connecting said first bus to said slave data terminal; and
a second bus coupling said control lines from said main and slave control terminals.

* * * * *